(12) United States Patent
Xiong

(10) Patent No.: US 11,064,588 B1
(45) Date of Patent: Jul. 13, 2021

(54) CLAMPED RESONANT TANK WITH CONSTANT SOFT-SWITCHING AND STARTUP OVERSHOOT PREVENTION

(71) Applicant: Universal Lighting Technologies, Inc., Madison, AL (US)

(72) Inventor: Wei Xiong, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 17/011,124

(22) Filed: Sep. 3, 2020

Related U.S. Application Data

(60) Provisional application No. 62/911,680, filed on Oct. 7, 2019.

(51) Int. Cl.
*H05B 45/382* (2020.01)
*H05B 45/34* (2020.01)

(52) U.S. Cl.
CPC ........... *H05B 45/382* (2020.01); *H05B 45/34* (2020.01)

(58) Field of Classification Search
CPC .............................. H05B 45/382; H05B 45/34
See application file for complete search history.

(56) References Cited

U.S. PATENT DOCUMENTS

| | | | |
|---|---|---|---|
| 7,990,070 B2 | 8/2011 | Nerone | |
| 8,699,244 B1 | 4/2014 | Xiong | |
| 8,723,428 B2 | 5/2014 | Yao | |
| 8,847,512 B1 | 9/2014 | Xiong | |
| 9,065,343 B2 | 6/2015 | Hu | |
| 9,419,514 B1 | 8/2016 | Xiong | |
| 9,769,890 B1 | 9/2017 | Xiong et al. | |
| 9,787,195 B1* | 10/2017 | Xiong | H05B 45/37 |
| 9,837,913 B1 | 12/2017 | Xiong | |
| 9,853,555 B2* | 12/2017 | Ramabhadran | H02M 3/33546 |
| 10,098,202 B1 | 10/2018 | Xiong | |
| 10,320,303 B1* | 6/2019 | Xiong | H02M 1/4225 |
| 10,326,377 B1* | 6/2019 | Xiong | H05B 45/305 |
| 10,707,763 B1* | 7/2020 | Xiong | H05B 45/39 |
| 2011/0068700 A1 | 3/2011 | Fan | |
| 2013/0162157 A1 | 6/2013 | Suzuki et al. | |

(Continued)

OTHER PUBLICATIONS

On Semiconductor: "NCP1392B, NCP1392D High-Voltage Half-Bridge Driver with Inbuilt Oscillator," Mar. 2016—Rev. 4, 21 pages.

*Primary Examiner* — Daniel D Chang
(74) *Attorney, Agent, or Firm* — Patterson Intellectual Property Law, P.C.; Gary L. Montle; Jerry Turner Sewell

(57) ABSTRACT

An LED driver circuit includes a DC-to-AC inverter that provides a primary AC voltage to the input node of a resonant tank circuit. The resonant tank circuit includes a resonant tank circuit inductor, a resonant tank circuit capacitor and a primary winding of an output transformer. The resonant tank circuit capacitor and the primary winding are connected in parallel between a resonant tank circuit output node and a DC balance node. The DC balance node is coupled to a first bus by a first DC-blocking capacitor and is coupled to a second bus by a second DC-blocking capacitor. The output transformer has at least one secondary winding. An AC output voltage from the secondary winding is rectified to generate a DC voltage, which is applied to a load having a plurality of LEDs. The resonant tank circuit input node is clamped by first and second clamping diodes.

13 Claims, 9 Drawing Sheets

(56) References Cited

U.S. PATENT DOCUMENTS

2013/0271021 A1  10/2013  Elferich
2015/0257222 A1  10/2015  Siessegger et al.
2016/0073457 A1   3/2016  Nakajo
2019/0089254 A1*  3/2019  Op Het Veld ........ H02M 3/335

* cited by examiner

CLAMPED RESONANT TANK WITH CONSTANT SOFT-SWITCHING AND STARTUP OVERSHOOT PREVENTION

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCE TO RELATED APPLICATION

This application claims the benefit under 35 USC § 119(e) of U.S. Provisional Application No. 62/911,680, filed Oct. 7, 2019, entitled "Clamped Resonant Tank with Constant Soft-Switching and Startup Overshoot Prevention," which is hereby incorporated by reference in its entirety.

FIELD OF THE INVENTION

The present disclosure relates generally to lighting systems comprising light emitting diodes (LEDs), and, more particularly, relates to apparatuses to prevent flashing of LEDs when power is first applied to the LEDs.

BACKGROUND

A driver for an LED lighting system regulates the current through a load comprising a plurality of interconnected LEDs. The driver must provide a voltage of sufficient magnitude to forward bias a plurality of LEDs connected in series. Many drivers are designed to operate over a range of forward voltages in accordance with the number of LEDs connected in series. For example, a typical LED driver can provide an output voltage of approximately 90 volts to drive 30 LEDs connected in series and can also provide an output voltage of approximately 50 volts to drive 17 LEDs in series. Known LED drivers do not adequately control the output voltage across the LEDs during a startup period. If the voltage across the LEDs is not controlled during the startup period, the voltage may have a turn-on overshoot that causes the voltage to be sufficient temporarily to cause the LEDs to flash on for a short duration and then turn off until the voltage becomes stable. The flash can be annoying and can also harm the LEDs under certain conditions. The flash may occur, for example, when driving a plurality of LEDs requiring a voltage at the lower end of the range of voltages of the LED driver. The driver may also have a very high turn-on current spike in the half-bridge switching circuit and may incur hard switching of the transistors in the switching circuit.

SUMMARY

A need exists for an LED driver that operates over a wide range of voltages and that prevents the LEDs from flashing on and then off during a startup period. A need also exists for preventing an LED driver from becoming uncontrolled when a load is abruptly removed from the LED driver.

One aspect of the embodiments disclosed herein is an LED driver circuit that includes a DC-to-AC inverter that provides a primary AC voltage to the input node of a resonant tank circuit. The resonant tank circuit includes a resonant tank circuit inductor, a resonant tank circuit capacitor and a primary winding of an output transformer. The resonant tank circuit capacitor and the primary winding are connected in parallel between a resonant tank circuit output node and a DC balance node. The DC balance node is coupled to a first bus by a first DC-blocking capacitor and is coupled to a second bus by a second DC-blocking capacitor. The output transformer has at least one secondary winding. An AC output voltage from the secondary winding is rectified to generate a DC voltage, which is applied to a load having a plurality of LEDs. The resonant tank circuit input node is clamped by first and second clamping diodes.

Another aspect of the embodiments disclosed herein is a driver circuit for providing DC power to a DC load having a plurality of light-emitting diodes (LEDs). The driver circuit comprises a reference bus. A voltage source provides an input voltage referenced to the reference bus. An input voltage bus receives the input voltage. A variable-frequency voltage generation circuit generates a square-wave signal on a switched node. The square-wave signal has a first frequency at an initial startup and has a second, lower frequency when operating in a steady-state condition. A resonant tank circuit has an input connected to the switched node and has a resonant tank circuit output node. The resonant tank circuit comprises a resonant tank circuit inductor connected between the switched node and the resonant tank circuit output node. The resonant tank circuit further comprises a resonant tank circuit capacitor. The resonant tank circuit capacitor is connected between the resonant tank circuit output node and a DC balance node. An output transformer has a primary winding having a first terminal connected to the resonant tank circuit output node and has a second terminal connected to the DC balance node. The output transformer has at least one secondary winding that generates a secondary AC voltage responsive to a primary voltage across the primary winding. A first DC-blocking capacitor is connected between the input voltage bus and the DC balance node. A second DC-blocking capacitor is connected between the DC balance node and the reference bus. A rectifier circuit is connected to the at least one secondary winding of the output transformer to receive the secondary AC voltage. The rectifier circuit is configured to rectify the secondary AC voltage to provide a DC voltage to the DC load to produce a load current through the DC load.

In certain embodiments in accordance with this aspect, the resonant tank circuit capacitor has a resonant tank capacitance. Each of the first DC-blocking capacitor and the second DC-blocking capacitor has DC-blocking capacitance. The DC-blocking capacitance is greater than the resonant tank capacitance. In certain embodiments, the DC-blocking capacitance is at least twenty times the resonant tank capacitance.

In certain embodiments in accordance with this aspect, a first clamping diode connected between the resonant tank circuit output node and the input voltage bus; and a second clamping diode connected between the resonant tank circuit output node and the reference bus.

In certain embodiments in accordance with this aspect, the variable-frequency switching circuit comprises a first semiconductor switch coupled between the input voltage bus and a switched node, and a second semiconductor switch coupled between the switched node and the reference bus. A self-oscillating switch driver integrated circuit (IC) has a first driver output coupled to the first semiconductor switch and has a second driver output coupled to the second semiconductor switch. The switch driver IC selectively enables the first semiconductor and the second semiconductor switch at a variable frequency to generate a switched voltage signal on the switched node. The switch driver IC varies the variable frequency in response to a magnitude of an input parameter on a control terminal. A frequency control circuit is connected to the control terminal of the switch driver IC. The frequency control circuit provides the input parameter to the control terminal. The frequency control circuit provides the input parameter at a first magnitude when the voltage source initially provides the input voltage on the input voltage bus. The frequency control circuit varies the input parameter to a second magnitude over a selected duration. The switch driver IC is responsive to the first magnitude to operate at a first frequency when the voltage source initially provides power to the input voltage bus and is responsive to the second magnitude to operate at a second frequency after the selected duration. In certain embodiments, the input parameter is a resistance. The resistance has a first lower magnitude when the voltage source initially provides the input voltage to the input voltage bus. The first lower magnitude causes the switch driver IC to operate at a first frequency. The resistance has a second higher magnitude after the selected duration. The second higher magnitude causes the switch driver IC to operate at a second frequency, the second frequency lower than the first frequency.

Another aspect of the embodiments disclosed herein is a method for preventing startup flash of a light-emitting diode (LED) load. The method comprises switching a switched node voltage between a first voltage magnitude and a second voltage magnitude at a variable frequency. The variable frequency has a first frequency at an initial startup and has a second frequency a selected duration after the initial startup. The method further comprises applying the switched node voltage to an input of a resonant tank circuit. The resonant tank circuit has a resonant tank circuit inductor, a resonant tank circuit capacitor and a primary winding of an output transformer. The resonant tank circuit inductor is connected between the input of the resonant tank circuit and a resonant tank circuit output node. The resonant tank circuit capacitor and the primary winding of the output transformer are connected in parallel between the resonant tank circuit output node and a DC balance node. The method further comprises coupling a first DC-blocking capacitor between the DC balance node a first bus having the first voltage magnitude. The method further comprises coupling a second DC-blocking capacitor between the DC balance node and a second bus having the second voltage magnitude. The method further comprises rectifying an AC voltage on a secondary winding of the output transformer to generate a DC output voltage to drive the LED load.

In certain embodiments in accordance with this aspect, the method further comprising selecting a capacitance for each of the first DC-blocking capacitor and the second DC-blocking capacitor to be greater than a capacitance of the resonant tank circuit capacitor. In certain embodiments, the capacitance of each of the first DC-blocking capacitor and the second DC-blocking capacitor is at least twenty times the capacitance of the resonant tank circuit capacitor.

In certain embodiments in accordance with this aspect, the method further comprises coupling a first clamping diode between the resonant tank circuit output node and the first bus; and coupling a second clamping diode between the resonant tank circuit output node and the second bus.

Another aspect of the embodiments disclosed herein is a driver circuit for providing DC power to a DC load having a plurality of light-emitting diodes (LEDs). The driver circuit comprises a voltage source that provides an input voltage on an input voltage bus. The input voltage is referenced to a reference voltage on a reference bus. A switching circuit generates a switched voltage on a switched node. The switched voltage switches between the input voltage and the reference voltage. A DC balance circuit comprises a first DC-blocking capacitor connected between the input voltage bus and a DC balance node and comprises a second DC-blocking capacitor connected between the DC balance node and the reference bus. A resonant tank circuit has an input connected to the switched node and having a resonant tank circuit output node. An output transformer has a primary winding. The primary winding has a first terminal coupled to the resonant tank circuit output node and has a second terminal coupled to the DC balance node. The output transformer has at least one secondary winding. An output circuit is connected to the at least one secondary winding to provide power to the DC load.

In certain embodiments in accordance with this aspect, the resonant tank circuit includes a resonant tank inductor connected between the resonant tank circuit input node and the resonant tank circuit output node. A resonant tank circuit capacitor is connected between the resonant tank circuit output node and the DC balance node. The resonant tank circuit capacitor is connected in parallel with the primary winding of the output transformer. The resonant tank circuit capacitor has a resonant tank capacitance. Each of the first DC-blocking capacitor and the second DC-blocking capacitor has a DC-blocking capacitance, which is greater than the resonant tank capacitance. In certain embodiments, the DC-blocking capacitance is at least twenty times the resonant tank capacitance.

In certain embodiments in accordance with this aspect, the switching circuit operates at a first operating frequency when the voltage source initially provides the input voltage and operates at a decreasing operating frequency during an initial startup duration. The switching circuit operates at a constant operating frequency after the initial startup duration. The constant operating frequency lower than the first operating frequency.

BRIEF DESCRIPTIONS OF THE SEVERAL VIEWS OF THE DRAWINGS

Figure 1:
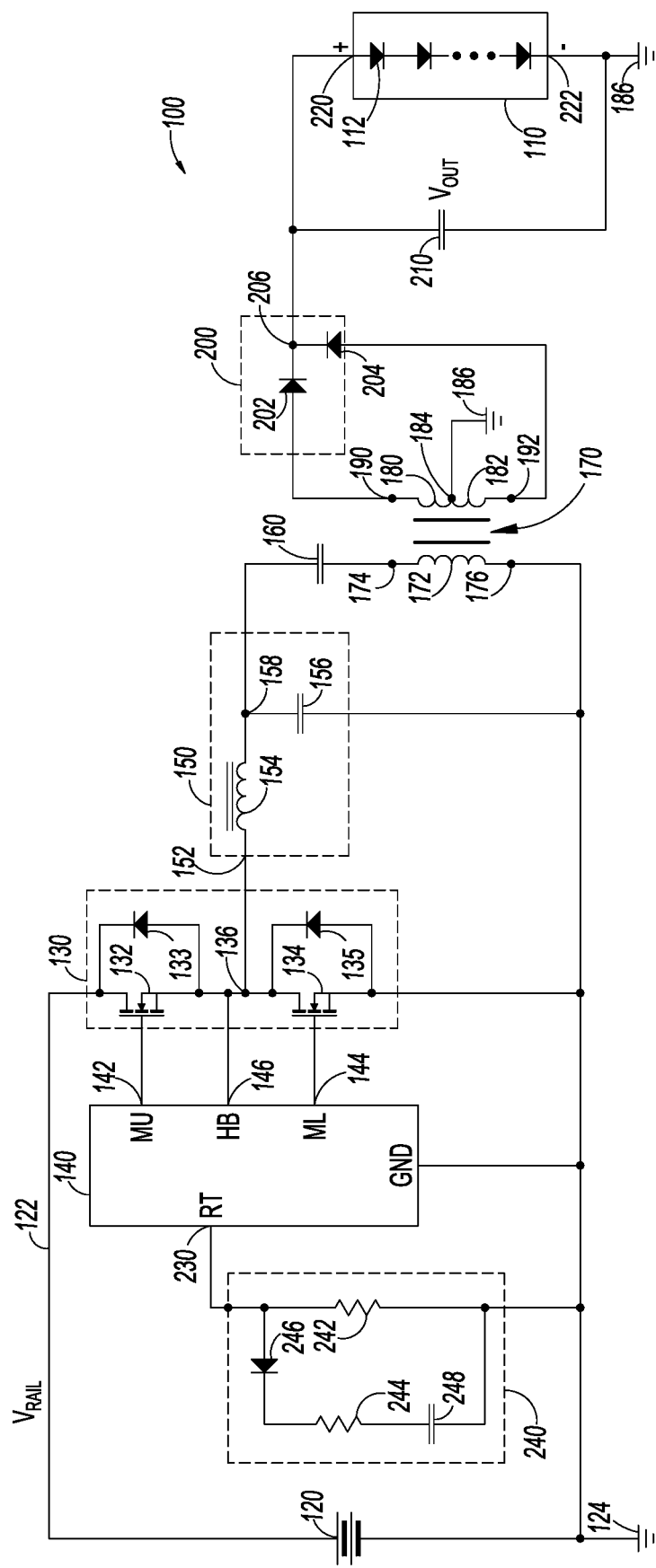
FIG. 1 illustrates a circuit diagram of a half-bridge resonant DC-DC converter configured as an LED driver, which may exhibit startup overshoot.
Figure 4:
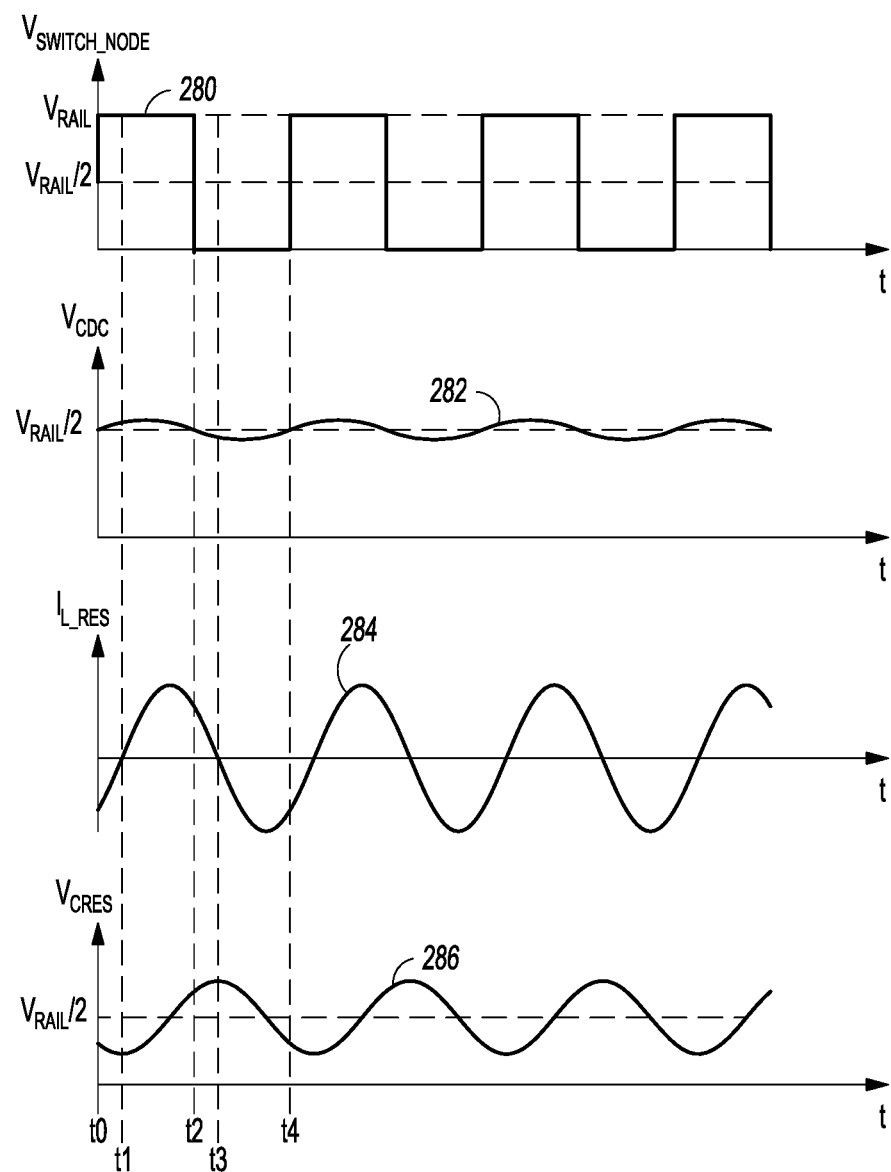

FIG. 4 illustrates waveforms that show the relationships of the voltage ($V_{SWITCH\_NODE}$) from the half-bridge switching circuit, the voltage ($V_{CDC}$) across the DC-blocking capacitor, the current ($I_{LRES}$) through the resonant inductor, and the voltage ($V_{CRES}$) across the resonant capacitor of the LED driver circuit of FIG. 1 with respect to time when the operating frequency is at a steady-state operating frequency.

Figure 5:
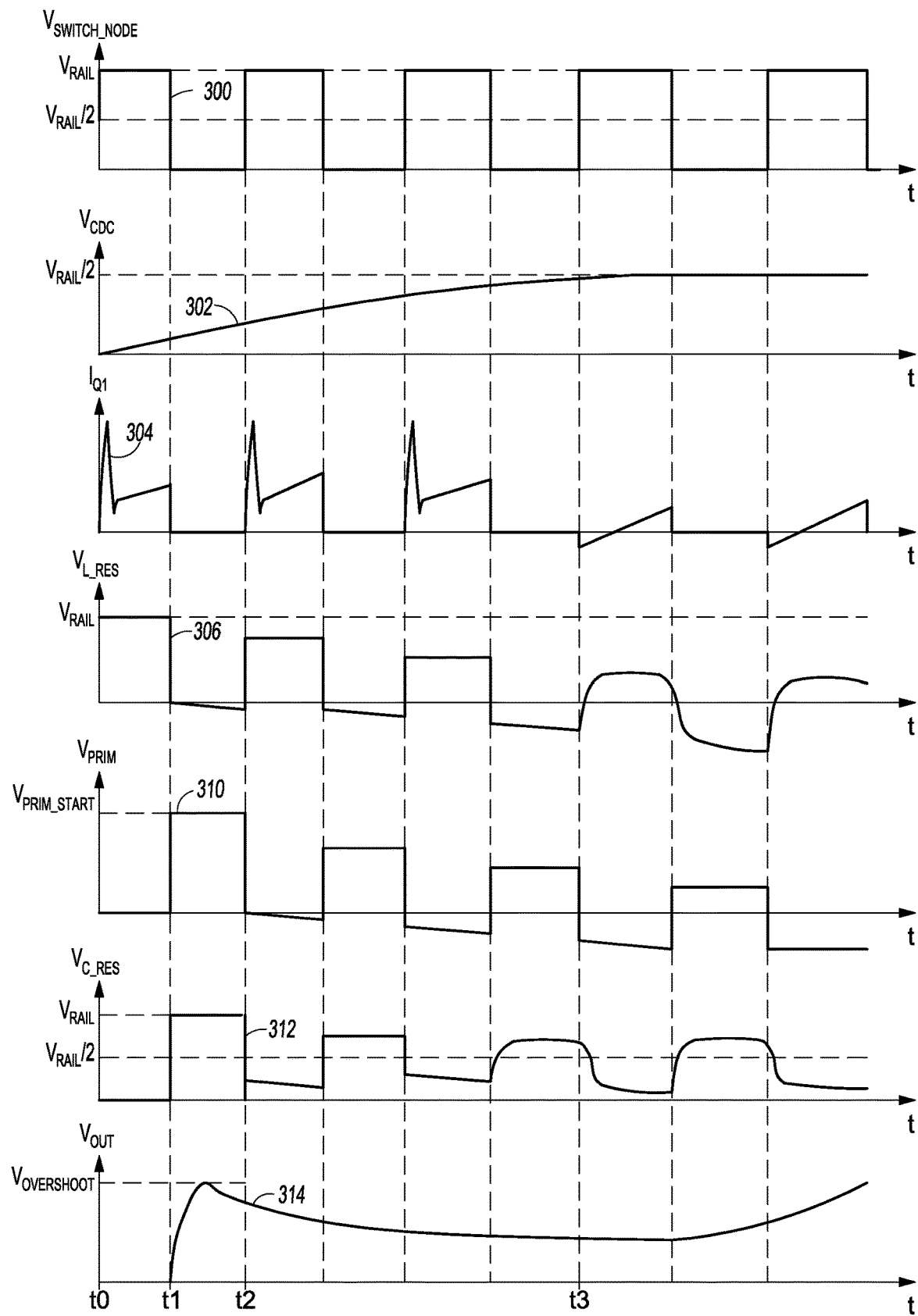

FIG. 5 illustrates waveforms that show the relationships of the voltage ($V_{SWITCH\_NODE}$) from the half-bridge switching circuit, the voltage ($V_{CDC}$) across the DC-blocking capacitor, the current ($I_{Q1}$) through the first semiconductor switch, the voltage ($V_{LRES}$) across the resonant inductor, the voltage ($V_{PRIM}$) across the primary of the output transformer, the voltage ($V_{CRES}$) across the resonant capacitor, and the voltage ($V_{OUT}$) across the output capacitor of the circuit of FIG. 1 with respect to time during startup from an empty tank circuit ($V_{CDC}(0)=0$ volts).

Figure 6:
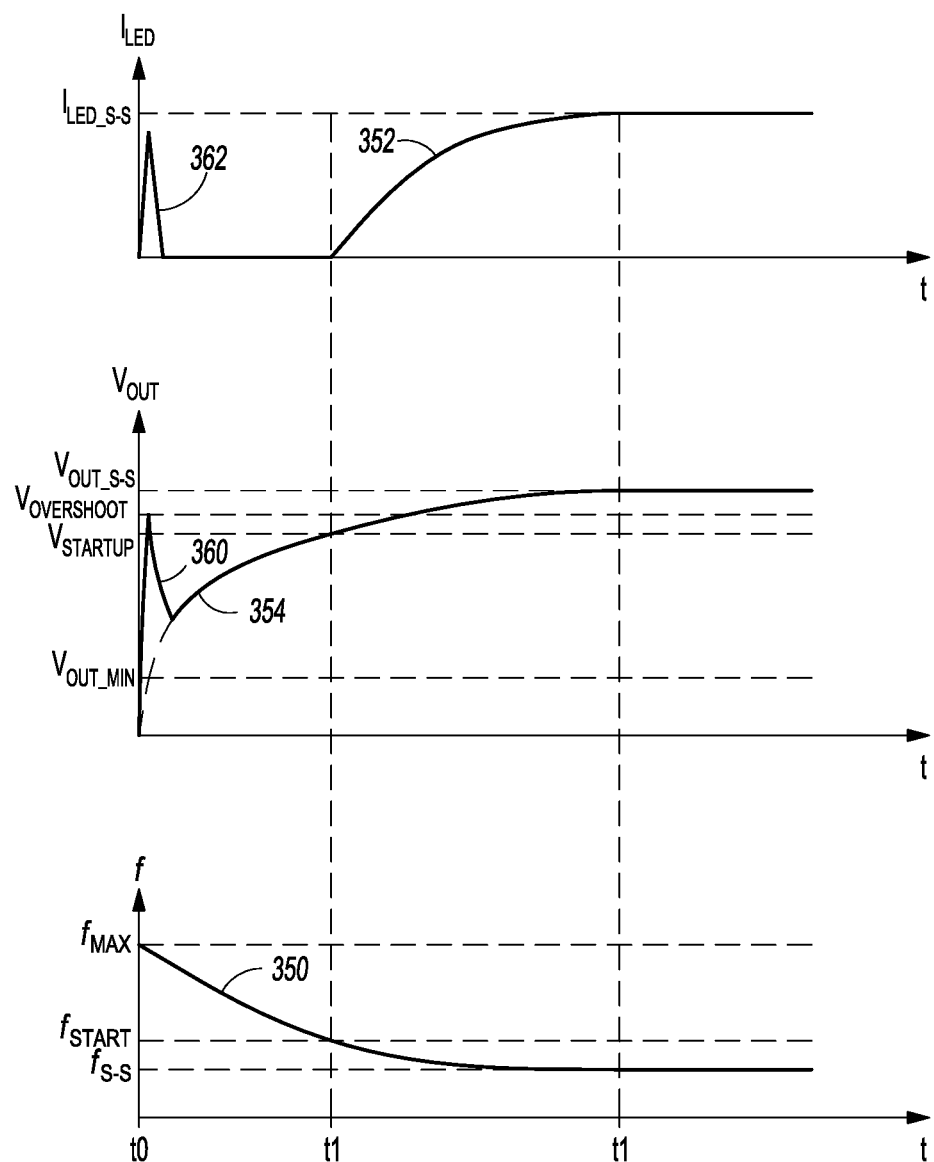

FIG. 6 illustrates the relationship between the current ($I_{LED}$) through the LEDs, the output voltage ($V_{OUT}$) and the operating frequency ($f_{OP}$) showing the spikes in the current and voltage that cause LED turn-on flash.

Figure 7:
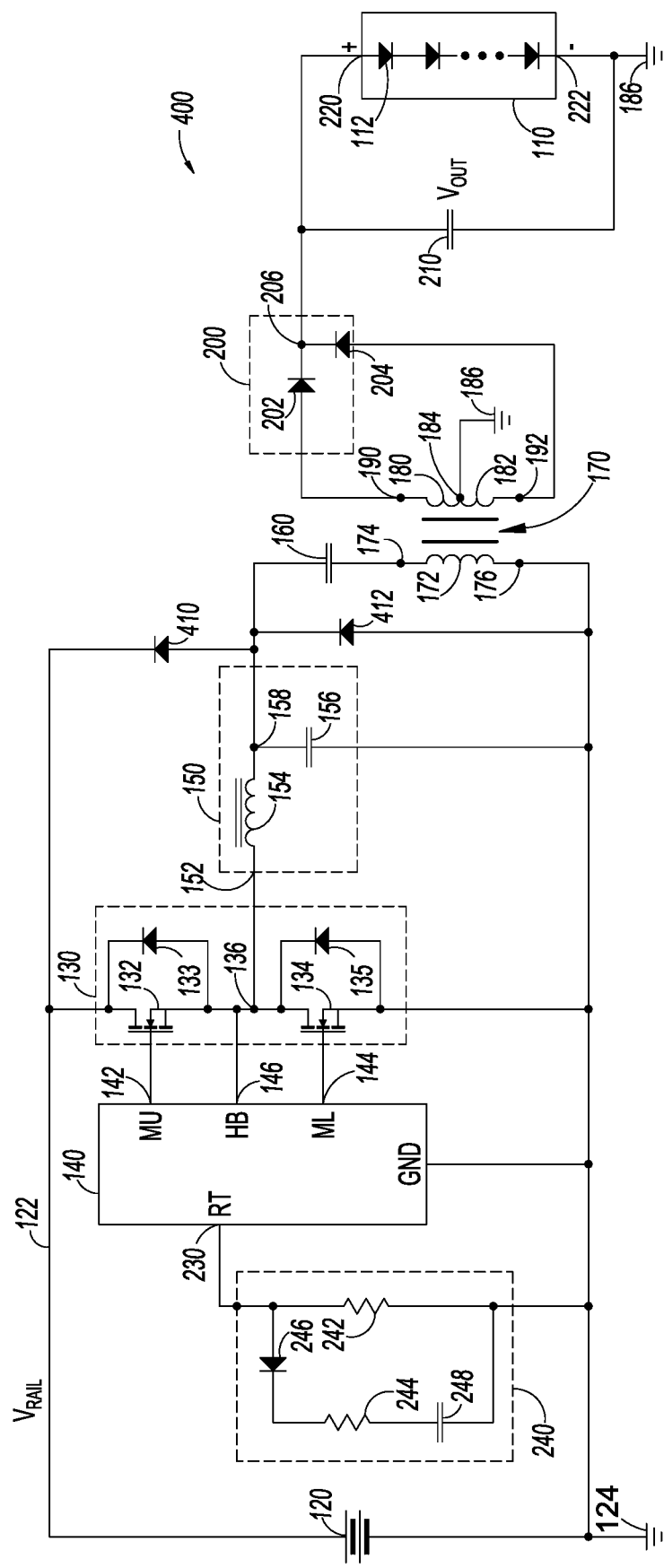

FIG. 7 illustrates a modified LED driver circuit that clamps the AC voltage on the resonant tank circuit capacitor to suppress transient hard switching.

Figure 8:
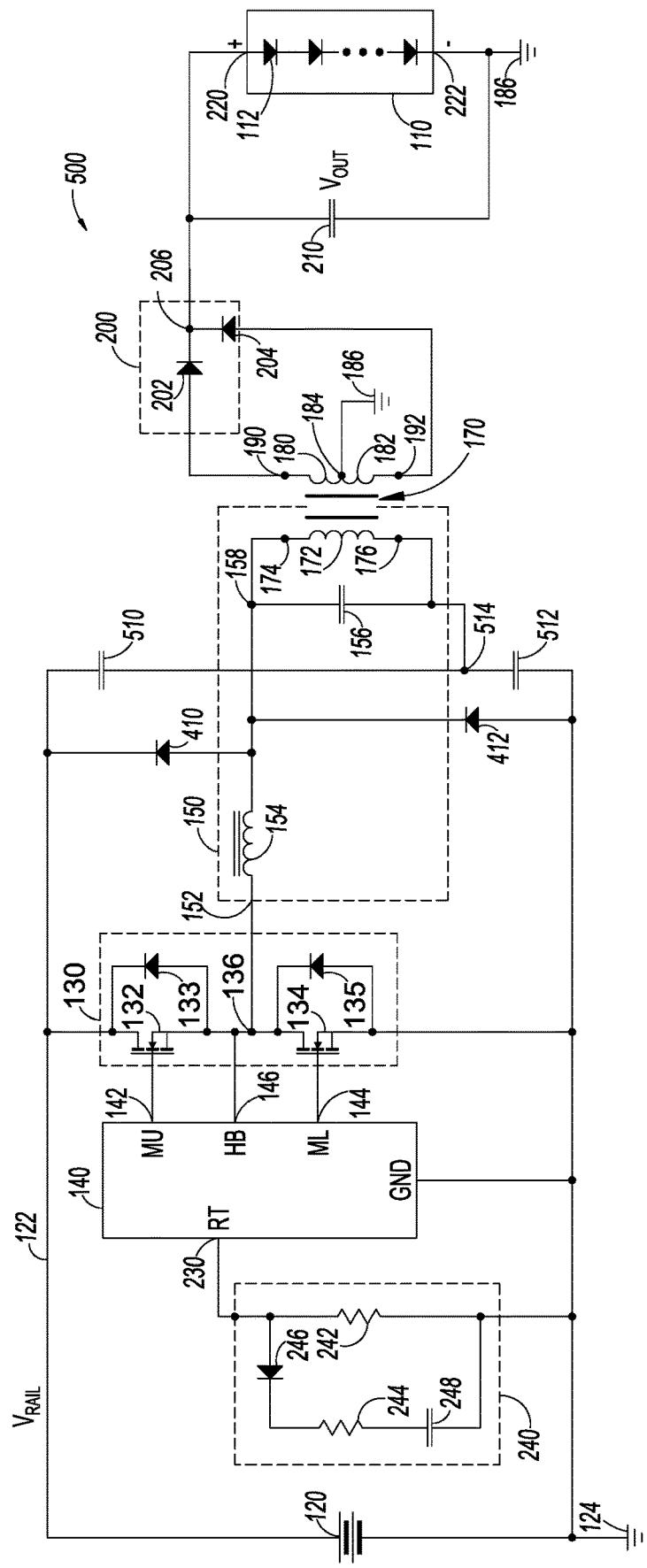

FIG. 8 illustrates a further modified LED driver circuit having a clamped tank circuit to provide a natural DC balance.

Figure 9:
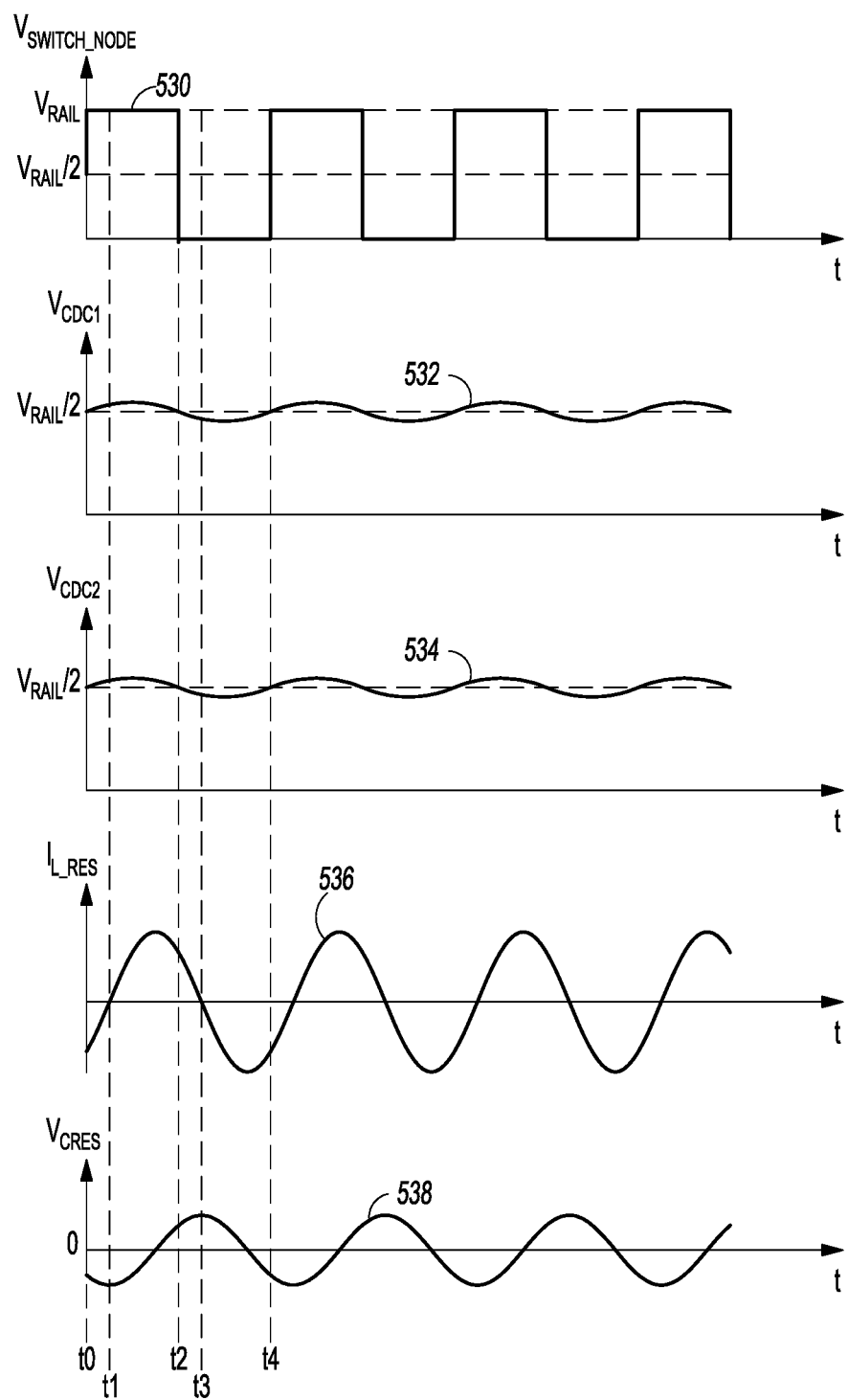

FIG. 9 illustrates waveforms that show the relationships of the voltage ($V_{SWITCH\_NODE}$) from the half-bridge switching circuit, the voltage ($V_{CDC1}$) across the first DC-blocking capacitor, the voltage ($V_{CDC2}$) across the second DC-blocking capacitor, the current ($I_{LRES}$) through the resonant inductor, and the voltage ($V_{CRES}$) across the resonant capacitor of the LED driver circuit of FIG. 8 with respect to time when the operating frequency is at a steady-state operating frequency.

Figure 10:
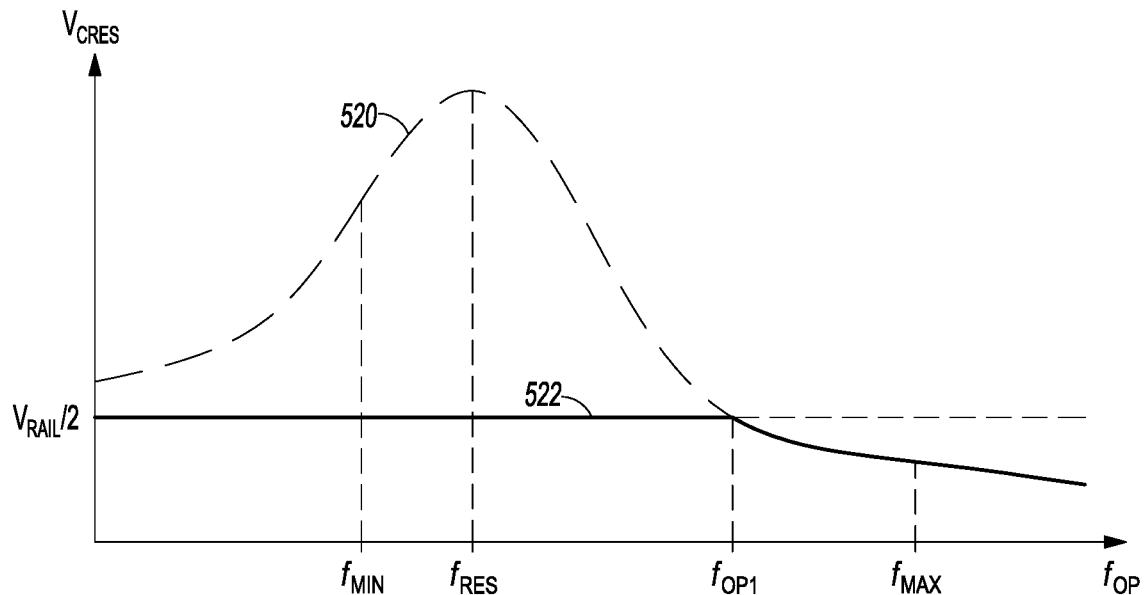

FIG. 10 illustrates a clamped tank gain curve showing the relationship between voltage (VCRES) across the resonant tank capacitor and the operating frequency for the clamped LED driver circuit of FIG. 8 (solid line) and the unclamped LED driver circuit of FIG. 1 (dashed line).

Figure 11:
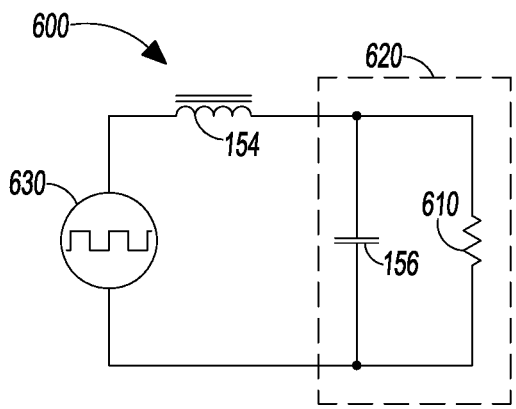

FIG. 11 illustrates an AC equivalent circuit for the resonant tank circuit of FIG. 8.

Figure 12:
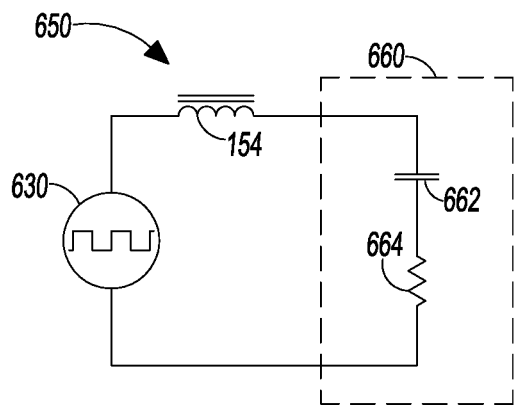

FIG. 12 illustrates a modified AC equivalent circuit with the parallel R-C circuit converted to a series R-C circuit.

DETAILED DESCRIPTION

The following detailed description of embodiments of the present disclosure refers to one or more drawings. Each drawing is provided by way of explanation of the present disclosure and is not a limitation. Those skilled in the art will understand that various modifications and variations can be made to the teachings of the present disclosure without departing from the scope of the disclosure. For instance, features illustrated or described as part of one embodiment can be used with another embodiment to yield a still further embodiment.

The present disclosure is intended to cover such modifications and variations as come within the scope of the appended claims and their equivalents. Other objects, features, and aspects of the present disclosure are disclosed in the following detailed description. One of ordinary skill in the art will understand that the present discussion is a description of exemplary embodiments only and is not intended as limiting the broader aspects of the present disclosure.

FIG. 1 illustrates a known LED driver (or driver circuit) 100 based on a popular topology for a half-bridge resonant DC-DC converter. The LED driver exhibits a high efficiency and good stability over a wide output range for the voltage applied to an LED load 110. For example, the output voltage may be approximately 50 volts when the LED load comprises 17 LEDs 112, and the output voltage may be approximately 90 volts when the LED load comprises 30 LEDs.

As shown in FIG. 1, the LED driver 100 is provided with DC power from a DC voltage source 120. The DC voltage source may be a power factor correction circuit (PFC) or other electronic constant voltage source. For ease of illustration, the DC voltage source is shown as a battery that provides a constant DC voltage identified as $V_{RAIL}$. The DC voltage is applied to a voltage bus 122 and is referenced to a primary ground bus 124, which is also referred to herein as a reference bus.

The DC voltage $V_{RAIL}$ on the voltage bus 122 is applied to a half-bridge switching circuit 130 comprising a first switch 132 and a second switch 134. In the illustrated embodiment, the two switches are metal oxide semiconductor field effect transistors (MOSFETs). Each switch has a respective drain (upper) terminal, a respective source (lower) terminal and a respective control (gate) terminal. The drain (upper terminal) of the first semiconductor switch is connected to the voltage bus. The source (lower terminal) of the first semiconductor switch is connected to the drain (upper terminal) of the second semiconductor switch at a switched node 136. The source (lower terminal) of the second semiconductor switch is connected to the primary ground bus 124. The switched node is the output of the half-bridge switching circuit. Each switch includes a respective body diode incorporated into the switch. A first body diode 133 has an anode connected to the source of the first semiconductor switch and a cathode connected to the drain of the first semiconductor switch. A second body diode 135 has an anode connected to the source of the second semiconductor switch and a cathode connected to the drain of the second semiconductor switch.

The first semiconductor switch 132 and the second semiconductor switch 134 are selectively turned on and turned off by a half-bridge driver integrated circuit (driver IC) 140. A first (MU) output 142 of the driver IC is connected to the gate of the first semiconductor switch. A second (ML) output 144 of the driver IC is connected to the gate of the second semiconductor switch. A half-bridge (HB) terminal 146 of the driver IC is connected to the switched node 136 of the half-bridge switching circuit 130. In the illustrated embodiment, the driver IC is a self-oscillating IC, such as an NCP1392B "High-Voltage Half-Bridge Driver with Inbuilt Oscillator" from ON Semiconductor Company. The illustrated driver IC is a very cost-effective half-bridge drive IC for LED driver design. Other half-bridge driver ICs from other sources may also be used. The driver IC sets the steady-state frequency to maintain a constant output current for certain load range (e.g., a selected number of LEDs 112 connected in series in the LED load 110).

The switched node 136 of the half-bridge switching circuit 130 is connected to an input node 152 of a resonant tank circuit 150. The main components of the resonant tank circuit are a resonant tank circuit inductor 154 and a resonant tank circuit capacitor 156. A first terminal of the resonant tank circuit inductor is connected to the input of the tank circuit and thus to the switched node of the half-bridge switching circuit. A second terminal of the resonant tank circuit is connected to a first terminal of the resonant tank circuit capacitor at a resonant tank circuit output node 158. A second terminal of the resonant tank circuit capacitor is connected to the primary ground bus 124.

A first terminal of a DC-blocking capacitor 160 is connected to the resonant tank circuit output node 158. A second terminal of the DC-blocking capacitor is connected to a first terminal 174 of a primary winding 172 of an output transformer 170. A second terminal 176 of the primary winding of the output terminal is connected to the primary ground bus 124.

The output transformer 170 includes at least one secondary winding. In the illustrated embodiment, the output transformer includes a first secondary winding 180 and a second secondary winding 182. Respective first terminals of the two secondary windings are connected together at a center tap terminal 184, which is connected to a secondary ground bus (or reference bus) 186. The first secondary winding has a second terminal 190, which is the first secondary output terminal of the output transformer. The second secondary winding has a second terminal 192, which is the second secondary output terminal of the output transformer.

The first secondary output terminal 190 of the output transformer 170 is connected to an anode of a first rectifier diode 202 in an output rectifier circuit 200. The second secondary output terminal 192 of the output transformer is connected to an anode of a second rectifier diode 204 in the output rectifier circuit. A cathode of the first rectifier diode and a cathode of the second rectifier diode are connected together at a secondary output node 206. The secondary output node is connected to a first terminal of an output buffer and filter capacitor 210, which has a capacitance of $C_{OUT}$. A second terminal of the output buffer and filter capacitor is connected to the secondary ground bus 186. The two rectifier diodes and the output buffer and filter capacitor operate in a conventional manner to generate a DC output voltage $V_{OUT}$ on the secondary output node.

The secondary output node 206 of the output rectifier circuit 200 is also connected to a first (+) terminal 220 of the LED load 110. A second (−) terminal 222 of the LED load is connected to the secondary ground bus 186. The output voltage $V_{OUT}$ is applied across the LED load.

The driver IC 140 operates at a frequency controlled by an input parameter. In the illustrated embodiment, the input parameter is a resistance applied to a timing resistor input terminal (RT) 230. A higher resistance applied to the timing resistor input terminal decreases the operating frequency. A lower resistance applied to the timing resistor input terminal increases the operating frequency. In the LED driver 100 of FIG. 1, a timing control circuit 240 is connected to the timing resistor input terminal. The timing control circuit includes a first timing circuit resistor 242. The first timing circuit resistor has a first terminal connected to the timing resistor input terminal and has a second terminal connected to the primary ground bus 124. The timing control circuit further includes a second timing circuit resistor 244, a timing circuit diode 246 and a timing circuit capacitor 248. The timing circuit diode has an anode connected to the timing resistor input terminal. The timing circuit diode has a cathode connected to a first terminal of the second timing resistor. The second timing circuit resistor has a second terminal connected to a first terminal of the timing circuit capacitor. The timing circuit capacitor has a second terminal connected to the primary ground bus. The first timing circuit resistor has first resistance $R_1$ that determines the maximum operating frequency of the driver IC. The second timing resistor has a second resistance $R_2$. The second resistor is selectively connected in parallel with the first resistor to determine the minimum operating frequency of the driver IC. The timing circuit capacitor operates to selectively connect the second resistor in parallel with the first resistor. When power is initially applied to the LED driver 100, timing circuit capacitor is discharged and charges through the second timing circuit resistor. Accordingly, when power is initially applied, a resistance $R_{IN}$ applied to the timing resistor input terminal of the driver IC has a minimum resistance $R_{IN\_MIN}$, which is determined by the first resistance in parallel with the second resistance:

$$R_{IN\_MIN} = \frac{R_1 \times R_2}{R_1 + R_2}$$

The minimum resistance $R_{IN\_MIN}$ when power is initially applied causes the driver IC 140 to operate at a maximum operating frequency $f_{MAX}$. As the timing circuit capacitor charges, the effective resistance of $R_2$ in the circuit increases, which causes the overall resistance $R_{IN}$ to gradually increase to a maximum resistance $R_{IN\_MAX}$, which is equal to $R_1$. When the overall resistance $R_{IN}$ has increased to $R_1$, the driver IC operates at a minimum operating frequency $f_{MIN}$.

The driver IC 140 operates in accordance with the following frequency control equation:

$$f_{OP} = I_{RT} \times 250 \frac{\text{kHz}}{\text{mA}} = \frac{V_{REF}}{R_{IN}} \times 250 \frac{\text{kHz}}{\text{mA}} \qquad (1)$$

In Equation (1), $I_{RT}$ is the current out of the timing resistor input terminal 230 of the driver IC 140, which is determined by the resistance $R_{IN}$ applied to the timing resistor input terminal and by an internal reference voltage $V_{REF}$ of the driver IC. In the illustrated embodiment, the driver IC has a fixed internal reference voltage of 3.5 volts.

As discussed above, the maximum operating frequency $f_{MAX}$ occurs when the resistance $R_{IN}$ is lowest (e.g., $R_{IN} = R_{IN\_MIN}$) when power is initially applied and the first and second timing circuit resistors 242, 244 are in parallel. Thus, Equation (1) can be rearranged as follows for $f_{MAX}$:

$$f_{MAX} = \frac{3.5}{\frac{R_1 \cdot R_2}{R_1 + R_2}} \times 250 \frac{\text{kHz}}{\text{mA}} \qquad (2)$$

As discussed above, when the timing circuit capacitor 248 is fully charged, the input resistance $R_{IN}$ increases to $R_1$ and the corresponding equation for the minimum operating $f_{MIN}$ is:

$$f_{MIN} = \frac{3.5}{R_1} \times 250 \frac{\text{kHz}}{\text{mA}} \qquad (3)$$

As illustrated by Equations (2) and (3), in the transition from initial startup to steady-state condition, the operating frequency $f_{OP}$ sweeps from $f_{MAX}$ to $f_{MIN}$.

Figure 2:
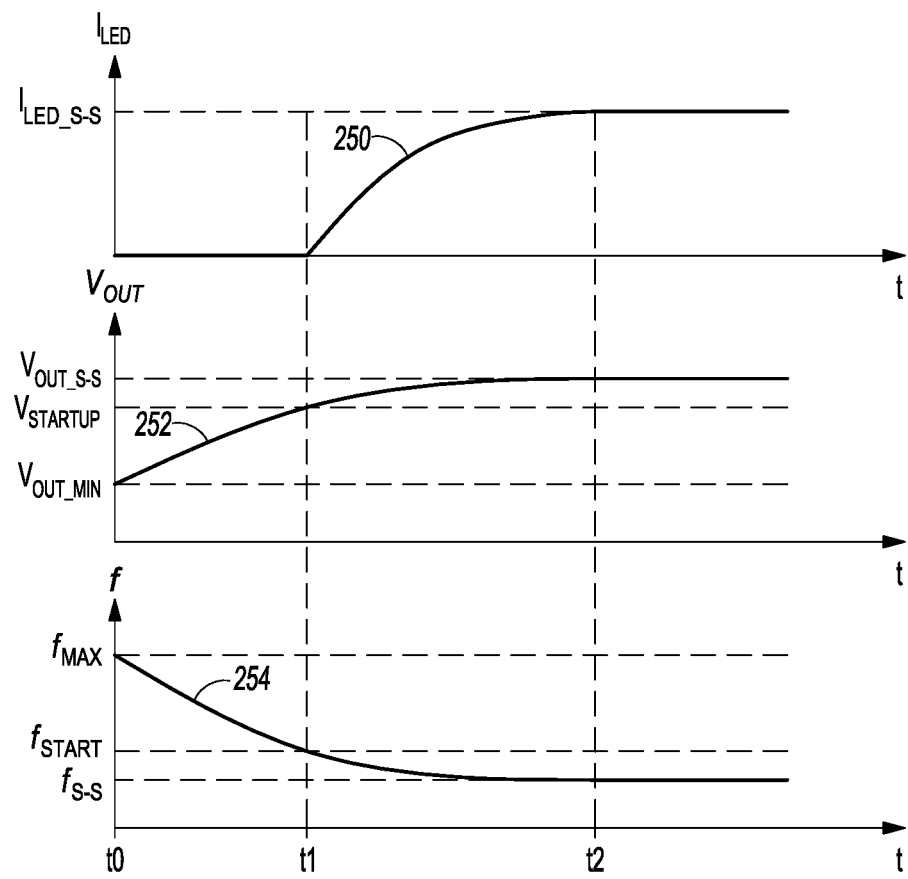
FIG. 2 illustrates the relationships of the output voltage ($V_{OUT}$), the LED current ($I_{LED}$) and the operating frequency ($f_{OP}$) of the LED driver of FIG. 1 from startup to steady-state operation for an ideal startup sequence when no overshoot occurs.

FIG. 2 illustrates a set of ideal waveforms that occur during an ideal startup sequence that occurs when power is applied to the LED driver 100. An uppermost waveform 250 represents a current $I_{LED}$ through the series-connected LEDs 112 in the LED load 110. A middle waveform 252 represents a voltage $V_{OUT}$ on the secondary output node 206 connected to the first (+) terminal 220 of the LED load. A lowermost waveform 254 represents the operating frequency $f_{OP}$ of the driver IC 140 versus time.

Figure 3:
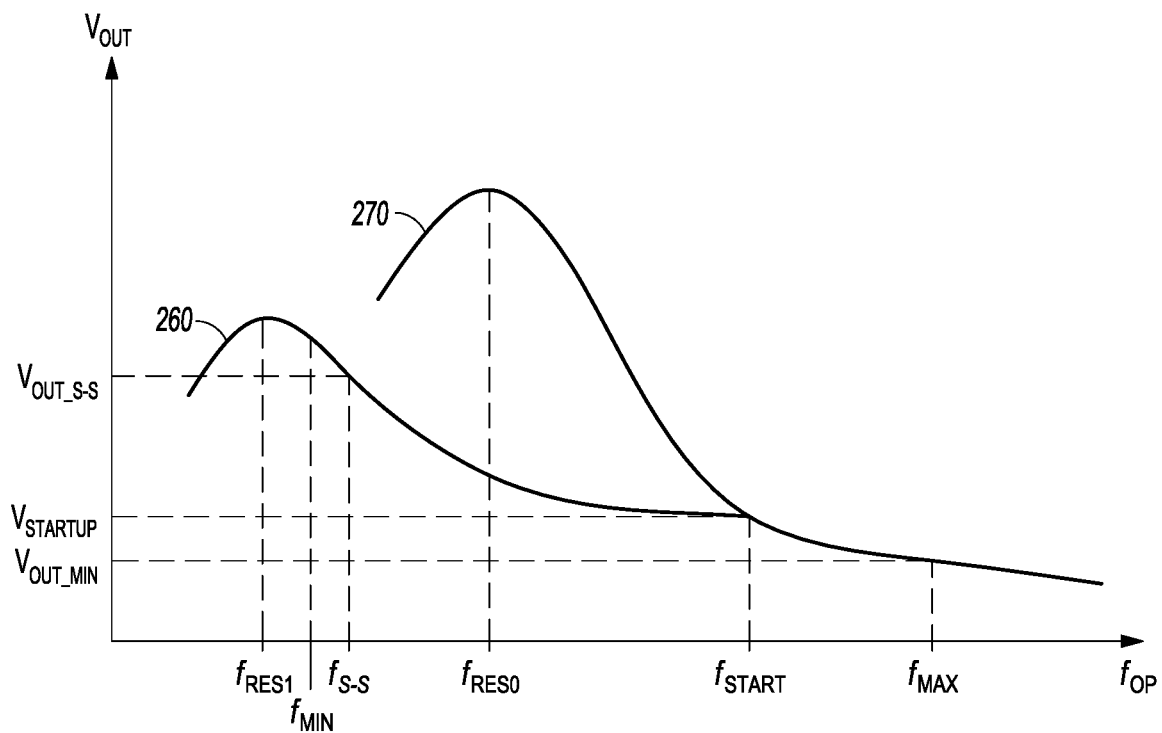
FIG. 3 illustrates the relationship between the output voltage ($V_{OUT}$) and the operating frequency $f_{OP}$ of the circuit of FIG. 1 for a loaded condition and for a no-load condition.

FIG. 3 illustrates relationships between the operating frequency $f_{OP}$ of the driver IC 140 and the output voltage $V_{OUT}$ on the resonant tank circuit output node 158 of the resonant tank circuit 150. A first graph 260 represents the relationship between the output voltage and the operating frequency for a fully loaded condition. A second graph 270 represents the relationship between the output voltage and the operating frequency for a no-load condition.

As shown in the first graph 260 of FIG. 3, when the operating frequency is at maximum value $f_{MAX}$, the tank output voltage is at minimum, $V_{OUT\_MIN}$. As the timing circuit capacitor 248 charges to cause the operating frequency to sweep lower to a starting frequency $f_{STARTUP}$, the tank output voltage reaches a sufficient voltage $V_{STARTUP}$ to forward bias the LEDs 112 and to cause the LEDs to turn on and illuminate. As the timing circuit capacitor continues to charge, the resistance $R_{IN}$ reaches a maximum value of $R_1$ and the operating frequency $f_{OP}$ reaches a steady-state operating frequency $f_{S-S}$. At the steady-state operating frequency, the driver IC is in a steady-state operating condition and generates a steady-state output voltage $V_{OUT\_S-S}$. As illustrated, the steady-state operating frequency is greater than a loaded resonant frequency $f_{RES\_LOADED}$ of the resonant tank circuit 150.

As shown in the second graph 270 of FIG. 3, the maximum voltage for a no-load condition is greater than for the loaded condition and is reached at a higher operating frequency $f_{RES\_UNLOADED}$. The greater maximum voltage can be harmful to components of the LED driver 100. For example, the greater maximum voltage can cause hard switching of the first semiconductor switch 132 and the second semiconductor switch 134. Ideally, the relationship between the output voltage and the frequency follows the no-load graph (second graph 270) until the output voltage reaches the startup voltage $V_{STARTUP}$ at the frequency $f_{STARTUP}$ and then follows the loaded graph (first graph 260) as the frequency continues to decrease and the output voltage continues to increase. If no load is present, the relationship remains in accordance with the no-load graph (second graph 270).

The foregoing is illustrated in FIG. 2. In FIG. 2, t0 is the time when power is initially applied to the LED driver 100. Starting at t0, the operating frequency $f_{OP}$ is initially at the maximum operating frequency $f_{MAX}$ and gradually decreases. The output voltage $V_{OUT}$ at the secondary output node 206 of the output rectifier circuit 200 is initially at a minimum output voltage of $V_{OUT\_MIN}$ and gradually increases as the operating frequency decreases. During a first interval from the time t0 to the time t1, the output voltage remains below a startup voltage magnitude $V_{STARTUP}$ and is insufficient to forward bias the LEDs 112 in the LED load 110. Thus, the LED current $I_{LED}$ remains at 0 throughout the first interval. At the time t1, the output voltage $V_{OUT}$ has increased to the startup voltage magnitude $V_{STARTUP}$, and current starts to flow through the LEDs in the LED load. The operating frequency when the output voltage reaches the startup magnitude is identified on the lowermost waveform as $f_{STARTUP}$. The operating frequency continues to decrease and the output voltage continues to increase during a second time interval from the time t1 to a time t2 until the output voltage reaches a steady-state output voltage $V_{OUT\_S-S}$. The operating frequency is at a steady-state operating frequency $f_{S-S}$. During the second time interval, the current through the LEDs continues to increase until the LED current reaches a steady-state current magnitude $I_{LED\_S-S}$. The gradual increase in the LED current causes a "soft start" of the illumination provided by the LEDs without any turn-on flash of the LEDs. During an extended interval starting at the time t2 and continuing until power is discontinued, the driver IC 140 operates to maintain the LED current at the steady-state magnitude by maintaining the operating frequency at the steady-state operating frequency.

In the ideal waveforms of FIG. 2, the output voltage $V_{OUT}$ increases gradually from the magnitude $V_{OUT}\_MIN$ to the startup magnitude $V_{STARTUP}$. The output voltage does not reach or exceed the startup magnitude until the operating frequency $f_{OP}$ has decreased to the startup frequency $f_{STARTUP}$ such the resonant tank circuit 150 is able to drive the primary winding 172 of the output transformer 170 with a sufficient voltage to maintain the output voltage at a magnitude at or above the startup magnitude. Once the startup magnitude is reached, the voltage does not decrease, and the LED current $I_{LED}$ continues to flow without interruption.

As indicated above, the ideal waveforms illustrated in FIG. 2 represent an ideal startup sequence; however, the ideal waveforms do not occur in an actual circuit constructed in accordance with the LED driver 100 under all conditions. For example, when the number of LEDs 112 in the LED load 110 is small such that the startup voltage is at or near the low end of the voltage range (e.g., around 50 volts), a spike in the output voltage $V_{OUT}$ may occur to cause the LEDs to flash on for a short duration during the startup sequence.

The cause of the startup (turn-on) spike can be understood in connection with the following description.

As discussed above, the LED driver 100 includes the resonant tank circuit 150, which is driven by the switched output of the half-bridge switching circuit 130 on the switched node 136. The output of the resonant tank circuit drives the primary winding 172 of the output transformer 170 via the DC-blocking capacitor 160. The voltages generated on the first and second secondary windings 180, 182 of the output transformer are applied to the output rectifier circuit 200, which produces the output voltage $V_{OUT}$. The operation of the LED driver during steady-state conditions is illustrated by a set of waveforms in FIG. 4.

An uppermost waveform 280 in FIG. 4 illustrates the voltage $V_{SWITCH\_NODE}$ on the switched node 136 when the operating frequency is at the steady-state operating frequency $f_{S-S}$. The switched node voltage has a square waveform centered about a DC offset voltage having a magnitude of approximately $V_{RAIL}/2$. The voltage on the switched node switches between approximately 0 volts (the ground reference voltage) and approximately $V_{RAIL}$ (the input voltage from the DC voltage source 120).

The output of the resonant tank circuit on the resonant tank circuit output node 158 is applied to the DC-blocking capacitor 160, which prevents DC current from flowing into the primary winding 172 of the output transformer 170. The DC-blocking capacitor has a large capacitance $C_{DC}$, which is typically greater than ten times a capacitance CRES of the resonant tank circuit capacitor 156. The impedance of the DC-blocking capacitor is close to 0 at the steady-state operating frequency $f_{S-S}$ such that the DC-blocking capacitor does not affect the operation of the resonant tank circuit. Because the DC-blocking capacitor is effectively a short circuit at the steady-state operating frequency, the primary winding of the output transformer is effectively connected directly across the resonant tank circuit capacitor. As illustrated by a second waveform 282 in FIG. 4, a voltage $V_{CDC}$ across the DC-blocking capacitor is a DC voltage having a magnitude of approximately $V_{RAIL}/2$ and having a small ripple at the steady-state operating frequency $f_{S-S}$. The DC offset voltage across the DC-blocking capacitor allows the resonant tank circuit 150 to operate at the selected steady-state operating frequency. If the DC offset voltage across the DC-blocking capacitor deviates from $V_{RAIL}/2$, the resonant tank circuit will not be balanced, and the resonant tank circuit will adjust to reach the balanced condition.

As shown by a third waveform 284 in FIG. 4, a current $I_{LRES}$ through the resonant tank circuit inductor 154 is a quasi-sinusoidal current at the steady-state frequency $f_{S-S}$. The resonant inductor current lags the switching voltage $V_{SWITCH\_NODE}$ because tank is inductive. This lagging resonant inductor current enables soft switching of the first semiconductor switch 132 and the second semiconductor switch 134. As illustrated by the third waveform, during an interval from t0 to t1, the negative inductor current remaining in the resonant tank circuit tank inductor 154 passes through the body diode 133 of the first semiconductor switch and the drain-to-source voltage is near 0 volts. Thus, when the first semiconductor switch starts to conduct current, zero-voltage-turn-on-switching (ZVS) occurs. At the time t1, the current passing through the body diode of the first semiconductor switch reaches 0, and the first semiconductor switch starts to conduct positive inductor current $I_{LRES}$ to the tank inductor via the switched node 136. In the interval between the time t1 and a time t2, the first semiconductor switch continues to conduct the positive inductor current.

At the time t2, the first semiconductor switch 132 turns off and the second semiconductor switch 134 turns on. Turning off the first semiconductor switch causes the positive inductor current $I_{LRES}$ to flow through the body diode 135 the second semiconductor switch. In an interval between the time t2 and a time t3, the body diode of the second semiconductor continues to conduct the positive inductor current remaining in the resonant tank circuit inductor 154, and the drain-to-source voltage of the second semiconductor switch is 0 volts. At the time t3, the body diode of the second semiconductor switch turns off when the inductor current reaches 0 volts. The second semiconductor switch starts to conduct negative inductor current while the drain-to-source voltage is at 0 volts. Thus, ZVS occurs. During an interval between the time t3 and a time t4, the second semiconductor switch 134 conducts the negative inductor current.

The foregoing cycle of positive inductor current $I_{LRES}$ and negative inductor current continues during steady-state conditions with ZVS occurring at each transition between turning of one of the first and second semiconductor switches 132, 134 and turning on the other semiconductor switch. This soft-switching behavior causes good efficiency, good thermal characteristics and acceptable electromagnetic interference (EMI).

As illustrated by a fourth waveform 286 in FIG. 4, a voltage $V_{CRES}$ is generated across the resonant tank circuit capacitor 156. The resonant capacitor voltage lags the resonant current by approximately 90 degrees. The resonant capacitor voltage is applied to the primary winding 172 of the output transformer 170 via the DC-blocking capacitor 160.

As shown in FIG. 4, the voltage $V_{CRES}$ (waveform 286) across the resonant tank circuit capacitor 156 and the voltage $V_{CDC}$ (waveform 282) across the DC-blocking capacitor 160 have a DC offset of approximately $V_{RAIL}/2$, which is generated at the switched node 136. The DC offset causes the DC voltage in the resonant tank circuit 150 to be balanced, which enables the above-described soft-switching behavior.

The ideal startup waveforms shown in FIG. 2 can only be obtained if the DC-blocking capacitor 160 is initially charged to $V_{RAIL}/2$ before the half-bridge switching circuit 130 begins switching. However, the conventional LED driver 100 of FIG. 1 does not include any circuitry to pre-charge the DC-blocking capacitor. Thus, the voltage $V_{CDC}$ across the DC-blocking capacitor is initially approximately 0 volts. This causes a large voltage overshoot on the output voltage $V_{OUT}$ and a large current spike when the first semiconductor switch 132 is first turned on. The voltage overshoot and the current spike are illustrated in the waveforms of FIG. 5.

In FIG. 5, seven waveforms represent six voltages and a current with respect to time in the driver of FIG. 1 during startup from an empty tank circuit such that the voltage $V_{CDC}$ of the DC-blocking capacitor 160 is initially at 0 volts. A first waveform 300 represents the voltage ($V_{SWITCH\_NODE}$) on the switched node 136 of the half-bridge switching circuit 130. A second waveform 302 represents the voltage ($V_{CDC}$) across the DC-blocking capacitor 160. A third waveform 304 represents a current ($I_{Q1}$) through the first semiconductor switch. A fourth waveform 306 represents the voltage ($V_{LRES}$) across the resonant tank circuit inductor 154. A fifth waveform 310 represents the voltage ($V_{PRIM}$) across the primary winding 172 of the output transformer 170. A sixth waveform 312 represents the voltage ($V_{CRES}$) across the resonant tank circuit capacitor 156. A seventh waveform 314 represents the voltage ($V_{OUT}$) across the output buffer and filter capacitor 210.

As shown in FIG. 5, when the resonant tank circuit 150 starts with the voltage $V_{CDC}$ (waveform 302) across the DC-blocking capacitor 160 at 0 volts. When the first semiconductor switch 132 first turns on at a time t0, a large current flows through the first semiconductor switch because no current is flowing through the body diode 133 of the first semiconductor switch from a previous cycle. The voltage $V_{CDC}$ across the DC-blocking capacitor 160 charges slowly because the DC-blocking capacitor has a large capacitance (e.g., approximately 220 nanofarads (220 nF) in the illustrated embodiment). When the first semiconductor switch first turns on during the interval from the time t0 to a time t1, all the DC voltage at the switched node 136 appears across the resonant tank circuit inductor 154 as a pulse of the resonant tank circuit inductor voltage $V_{LRES}$ because the voltage VIRES on the resonant tank circuit capacitor 156 and the voltage $V_{CDC}$ on the DC-blocking capacitor or both at 0 volts and cannot change instantaneously.

At the time t1, the first semiconductor switch 132 turns off and the second semiconductor switch 134 turns on. In an interval between the time t1 and a time t2, when the second semiconductor switch is on, the resonant tank circuit inductor 154 dumps all the energy in the inductor to the resonant tank circuit capacitor 156 and to the primary winding 172 of the output transformer 170 through the DC-blocking capacitor 160. The voltage on the primary winding caused by this energy transfer appears has a primary winding startup voltage magnitude identified as $V_{PRIM}$_START in FIG. 5 The dumping of the energy causes a large spike in the output voltage $V_{OUT}$ on the output buffer and filter capacitor 210 to an overshoot voltage $V_{OVERSHOOT}$. This is a transient condition that lasts for a few switching cycles until the voltage $V_{CDC}$ across the DC-blocking capacitor reaches $V_{RAIL}/2$ at a time t3.

The result of the voltage overshoot is illustrated in FIG. 6. In FIG. 6, a lowermost waveform 350 represents the operating frequency $f_{OP}$ of the driver IC 140 versus time as previously shown in FIG. 3. An upper waveform 352 represents the LED current $I_{LED}$ versus time. A middle waveform 354 represents the output voltage $V_{OUT}$ versus time. The waveforms start at an initial turn-on time to. A first time interval lasts from the time to to a time t1. A second interval lasts from the time t1 to a time t2. The time intervals in FIG. 6 are greater than the time intervals in FIG. 5.

A spike 360 occurs in the output voltage $V_{OUT}$ shortly after the time to. The voltage spike corresponds to the output voltage rapidly increasing to the overshoot voltage $V_{OVERSHOOT}$ as described above with respect to FIG. 5. If the magnitude of the voltage spike is sufficient to turn on the LEDs 112, a corresponding spike 362 occurs in the LED load current $I_{LED}$ as shown in FIG. 6. The large turn-on current spike is not controlled by the circuitry and the amount of energy in the turn-on current spike could harm the LEDs.

When the turn-on current spike 362 occurs, the output buffer and filter capacitor 210 partially discharges, the output voltage $V_{OUT}$ reduces and then continues to increase with decreasing operating frequency $f_{OP}$ until the output voltage reaches the startup voltage $V_{STARTUP}$ at the time t1. Before the time t1, the output voltage is less than $V_{STARTUP}$, and the current $I_{LED}$ through the LEDs 112 is 0. At the time t2, the magnitude of the output voltage reaches $V_{STARTUP}$ again; however, the output voltage is now controlled by the circuitry. The LEDs 112 start to conduct and the LED current $I_{LED}$ begins increasing with further decreases in the operating frequency. The LED current continues to increase until the operating frequency reaches the steady-state operating frequency $f_{S-S}$ at the time t2.

Because of the potential harm to the LEDs 112 and because of the annoying turn-on flash, an improved circuit is desired to prevent the voltage overshoot and the current spike described above.

An explanation for the transient hard-switching behavior that causes the turn-on voltage spike 360 and the turn-on current spike 362 can be explained in connection with FIG. 3. As shown in FIG. 3, the relationship between the output voltage $V_{OUT}$ and the operating frequency fOP is different for a fully loaded condition (graph 260) and a no-load condition (graph 270). The peak of each graph represents the output voltage at a respective self-resonant frequency of the resonant tank circuit 150. A first resonant frequency $f_{RES1}$ is the self-resonant frequency of the resonant tank circuit under a no-load condition. A second resonant frequency $f_{RES2}$ is the self-resonant frequency of the resonant tank circuit under a fully loaded condition. As illustrated the second resonant frequency $f_{RES2}$ for the fully loaded condition is lower than the first resonant frequency $f_{RES1}$ for the unloaded condition. As described below, the LED driver 100 of FIG. 1 is modified so that the maximum operating frequency $f_{MAX}$ and the startup frequency $f_{STARTUP}$ are both less than the first self-resonant frequency $f_{RES1}$ to assure that no hard switching occurs when the LED driver is unloaded. The LED driver is also modified so that the steady-state operating frequency $f_{S-S}$ and the minimum operating frequency are both less than the second self-resonant frequency $f_{RES2}$ when the LED driver is fully loaded.

The foregoing modifications can be understood by considering the effect on the LED driver 100 when the LED load 110 is suddenly removed. Before the LED load is removed, the resonant tank circuit 150 is operating in a steady-state condition at the steady-state operating frequency $f_{S-S}$. When the load is suddenly removed, the operating frequency will not change; however, the relationship between the output voltage $V_{OUT}$ and the operating frequency $f_{OP}$ will change from the relationship represented by the fully loaded graph 260 to the relationship represented by the no-load graph 270 in FIG. 3. Under the fully loaded condition, the steady-state operating frequency $f_{S-S}$ was greater than the second self-resonant frequency $f_{RES2}$; however, after the shift to the no-load condition, the steady-state frequency $f_{S-S}$ is now less than the first self-resonant frequency $f_{RES1}$. This condition causes the resonant tank circuit 150 to operate as a capacitive tank circuit, which causes severe hard switching of the first semiconductor switch 132 and the second semiconductor switch 134 because the residual inductor currents through the body diodes 133, 135 are no longer lagging. This change in the operation of the resonant tank circuit causes a large increase in the output voltage $V_{OUT}$ and also causes the temperatures of the two semiconductor switches to increase. The increased temperature may damage the two switches.

An initial modification to control hard switching of the first semiconductor switch 132 and the second semiconductor switch 134 is illustrated in a modified LED driver 400 shown in FIG. 7. The modified LED driver of FIG. 7 includes elements corresponding to the elements of the LED driver 100 of FIG. 1 and like components are labeled as shown in FIG. 1. The modified LED driver circuit of FIG. 7 includes a first clamping diode 410 having an anode connected to the resonant tank circuit output node 158 and having a cathode connected to the voltage bus 122. A second clamping diode 412 has an anode connected to the primary ground bus 124 and has a cathode connected to the resonant tank circuit output mode. The two clamping diodes operate to avoid hard switching of the first semiconductor switch 132 and the second semiconductor switch 134 as described in U.S. Pat. No. 10,098,202, which is incorporated herein by reference in its entirety, Although the addition of the first clamping diode 410 and the second clamping diode 412 to the modified LED driver 400 controls the hard-switching of the first semiconductor switch 132 and the second semiconductor switch 134, the two clamping diodes do not solve the problem with the turn-on voltage overshoot and the turn-on current spike described above.

FIG. 8 illustrates a further modified LED driver 500 that solves the problem with the turn-on voltage overshoot and the turn-on current spike described above. The further modified LED driver of FIG. 8 includes elements corresponding to the elements of the modified LED driver 400 of FIG. 7 and like components are labeled as shown in FIG. 7. The further modified LED driver of FIG. 8 includes the first clamping diode 410 and the second clamping diode 412, which are connected as shown in FIG. 7.

Unlike the LED driver 100 of FIG. 1 and the modified LED driver 400 of FIG. 7, the further modified LED driver of FIG. 8, splits the original DC-blocking capacitor 160 of FIGS. 1 and 7 into two capacitors. A first DC-blocking capacitor 510 is connected between the voltage bus 122 and a DC balance node 514. A second DC-blocking capacitor 512 is connected between the DC balance node and the primary ground bus 124. Thus, the two DC-blocking capacitors are connected in series between the voltage bus and the ground reference. Accordingly, the voltage $V_{RAIL}$ is applied across the series connected DC-blocking capacitors. The first DC-blocking capacitor has a capacitance of $C_{DC1}$, and the second DC-blocking capacitor has a capacitance of $C_{DC2}$. In the illustrated embodiment, the capacitances of the two DC-blocking capacitors are substantially equal. Thus, the voltage across each DC-blocking capacitor is one-half the rail voltage (e.g., $V_{CDC1}=V_{CDC2}=V_{RAIL}/2$) with a small ripple as described above. This forces the voltage on the DC balance node to always be $V_{RAIL}/2$, which forces the resonant tank circuit 150 into a steady-state DC balance. The capacitance $C_{DC1}$ of the first DC-blocking capacitor and the capacitance $C_{DC2}$ of the second DC-blocking capacitor are each much greater than the capacitance CRES of the resonant tank circuit capacitor 156. In the illustrated embodiment, the capacitances of the DC-blocking capacitor are at least twenty times greater than the capacitance of the resonant tank circuit capacitor. For example, the capacitance of the resonant tank circuit capacitor may be 3.6 nanofarads (3.6 nF) and the capacitances of the DC-blocking capacitors may be 220 nanofarads (220 nF).

The first terminal of the resonant tank circuit capacitor 156 and the first terminal 174 of the primary winding 172 of the output transformer 170 are connected to the resonant tank circuit output node 158 as in FIGS. 1 and 7; however, the second terminal of the resonant tank circuit capacitor and the second terminal 176 of the primary winding of the output transformer are not connected to the primary ground bus 124 as before. Instead, the second terminal of the resonant tank circuit capacitor and the second terminal of the output transformer are connected to the DC balance node 514 as shown in FIG. 8. The primary winding of the output transformer is connected directly in parallel with the resonant tank circuit capacitor because the DC current through both components is blocked by the first and second DC-blocking capacitors.

The effect of the split first and second DC-blocking capacitors 510, 512 is illustrated by the waveforms in FIG. 9. In FIG. 9, a first waveform 530 represents the voltage ($V_{SWITCH\_NODE}$) on the switched node 136 of the half-bridge switching circuit 130 of the further modified LED driver circuit 500. A second waveform 532 represents the voltage ($V_{CDC1}$) across the first DC-blocking capacitor 510. A third waveform 534 represents the voltage ($V_{CDC2}$) across the second DC-blocking capacitor 512, which is also the voltage on the DC balance node 514 with respect to ground. A fourth waveform 536 represents the current ($I_{LRES}$) through the resonant tank circuit inductor 154. A fifth waveform 538 represents the voltage ($V_{CRES}$) across the resonant tank circuit capacitor 156. The waveforms of the LED driver circuit of FIG. 8 are all illustrated with respect to time when the operating frequency is at a steady-state operating frequency.

In comparison to the waveforms of FIG. 4, the waveforms of FIG. 9 have only two differences. Instead of one waveform representing one voltage across a single DC-blocking capacitor, the two waveforms of FIG. 9 represent respective voltages across each of the two DC-blocking capacitors 510, 512. More significantly, the fifth waveform 538 representing the voltage $V_{CRES}$ across the resonant tank circuit capacitor 156 of the LED driver circuit is no longer offset by $V_{RAIL}/2$ as shown in FIG. 4. Rather, in FIG. 9, the DC bias of for the voltage $V_{CRES}$ is 0 volts (e.g., an offset of 0 volts). This means the DC balance condition for the resonant tank circuit capacitor is 0 volts. The DC balance condition for each of the two DC-blocking capacitors is $V_{RAIL}/2$.

The further modified LED driver 500 of FIG. 8 always has a 0-volt offset of the voltage $V_{CRES}$ of the resonant tank circuit capacitor 156 and always has $V_{RAIL}/2$ DC offset across each of the first DC-blocking capacitor 510 and the second DC-blocking capacitor 512. These fixed offsets cause the resonant tank to be forced into steady-state operating conditions immediately after the driver IC 140 begins switching to start turning the first semiconductor switch 132 and the second semiconductor switch on and off as described above. The output voltage $V_{OUT}$ is responsive to the operating frequency $f_{OP}$ in accordance with the fully loaded graph 260 in FIG. 3. The output voltage $V_{OUT}$ and the LED current $I_{LED}$ operate in accordance with the $V_{OUT}$ waveform 252 and the $I_{LED}$ waveform 250, respectively, in FIG. 2. Accordingly, the further modified LED driver 500 of FIG. 8 accomplishes soft LED turn-on without any unacceptable turn-on flash. The first and second semiconductor switches operate with zero-voltage-turn-on-switching (ZVS) at initial turn on.

In the illustrated embodiment, the capacitance of each of the first DC-blocking capacitor 510 and the second DC-blocking capacitor 512 is selected to be at least 20 times the capacitance of the resonant tank circuit capacitor 156 so that the DC voltage across each of the DC-blocking capacitors is substantially constant. As discussed above, the DC voltage across each DC-blocking capacitor is maintained at $V_{RAIL}/2$ because the two DC-blocking capacitors divide the voltage $V_{RAIL}$ equally.

The first clamping diode 410 clamps the positive voltage across the resonant tank circuit capacitor 156. When the positive voltage across the resonant tank circuit capacitor is greater that $V_{RAIL}/2$, the first clamping diode conducts and clamps the voltage on the resonant tank circuit capacitor to a magnitude no greater than $V_{RAIL}/2$ (ignoring the diode forward voltage drop).

The second clamping diode 412 clamps the negative voltage across the resonant tank circuit capacitor 156. When the negative voltage across the resonant tank circuit capacitor is greater that $V_{RAIL}/2$, the second clamping diode conducts and clamps the voltage on the resonant tank circuit capacitor to a magnitude no greater than $V_{RAIL}/2$ (ignoring the diode forward voltage drop).

The first and second clamping diodes 410, 412 operate to clamp the AC peak voltage $V_{CRES}$ across the resonant tank circuit capacitor 156 at or below $V_{RAIL}/2$ to achieve the soft-switching behavior described above. The clamped tank gain curve showing the relationship between the AC peak voltage and the operating frequency $f_{OP}$ is illustrated in FIG. 10. In FIG. 10, a dashed graph 520 represents the unclamped voltage curve, and a solid graph 522 represents the clamped voltage curve.

As shown in FIG. 10, at any load, if tank is not clamped (dashed graph 520), the peak AC voltage $V_{CRES}$ across the resonant tank circuit capacitor 156 is greater than $V_{RAIL}/2$ when the operating frequency $f_{OP}$ is less than a certain operating frequency fops. The first clamping diode 410 and the second clamping diode 412 clamp the voltage $V_{CRES}$ to be no greater than $V_{RAIL}/2$ to guarantee the tank remains inductive all the time even when the operating frequency is less than the resonant operating frequency $f_{RES}$. When the voltage $V_{CRES}$ would otherwise to increase to a magnitude greater than $V_{RAIL}/2$, the two clamping diodes dump all the extra capacitive energy back to the DC-blocking capacitor or to the voltage bus 122 to effectively limit the capacitive energy circulating in the tank. This action ensures the tank remains inductive. As long as tank remains inductive, soft switching of the first semiconductor switch 132 and the second semiconductor switch always occurs.

The foregoing can be understood mathematically by reference to two equivalent circuits shown in FIG. 11 and FIG. 12.

FIG. 11 illustrates an initial equivalent circuit 600 in which the secondary load (e.g., the LED load 110) is reflected back to the primary as a reflected resistive load 610 having a resistance $R_{LOAD}$. The reflected resistive load is in parallel with the resonant tank circuit capacitor 156, which has a capacitance $C_{RES}$ to form a parallel RC circuit 620. The parallel RC circuit is connected in series with the resonant tank circuit inductor 154 and an AC source 630 corresponding to the driver IC 140 and the half-bridge switching circuit 130 that generate the square-wave voltage $V_{SWITCH\_NODE}$ as described above. For purposes of the AC analysis, the square-wave voltage is assumed to switch between $+V_{RAIL}/2$ and $-V_{RAIL}/2$ around 0 volts.

The initial equivalent circuit 600 of FIG. 11 can be modified to a further equivalent circuit 650 shown in FIG. 12. The AC source 630 and the resonant tank circuit inductor 154 remain connected as shown in FIG. 11; however, the parallel RC circuit 620 is replaced with an equivalent series RC circuit 660 comprising an equivalent resonant capacitor 662 in series with an equivalent resistive load 664. The equivalent resonant capacitor has a capacitance $C_{RES\_EQ}$.

The equivalent resistive load has a resistance $R_{LOAD\_EQ}$. The voltage across the resonant tank circuit capacitor 156 of FIG. 11 is the same as the total voltage across the series combination of the equivalent resonant capacitor and the equivalent resistive load in FIG. 12.

In FIG. 12, $Z_C$ is the AC impedance of the equivalent resonant capacitor 662 and $Z_L$ is the AC impedance of the resonant tank circuit inductor 154. The two AC impedances are calculated in accordance with the following Equations (4) and (5):

$$Z_C = \frac{1}{\omega \cdot C_{RES\_EQ}} \quad (4)$$

$$Z_L = \omega \cdot L_{RES} \quad (5)$$

In Equations (4) and (5), $Z_C$ and $Z_L$ are always positive values.

The voltage $V_{CRES}$ across the resonant tank circuit capacitor 156 in FIG. 11, which corresponds to the total voltage across the RC series circuit 660 of FIG. 12 can be determined in accordance with the following Equation (6):

$$V_{CRES} = \frac{R_{LOAD\_EQ} - jZ_C}{R_{LOAD\_EQ} - jZ_C + jZ_L} \times V_{SWITCH\_NODE} \quad (6)$$

When the voltage $V_{CRES}$ across the resonant tank circuit capacitor 156 is clamped to be no greater than the AC input voltage, which is $V_{RAIL}/2$, the absolute value of $V_{CRES}$ is less than the voltage $V_{SWITCH\_NODE}$ on the switched node 136 in accordance with the following Equation (7):

$$\left| \frac{R_{LOAD\_EQ} - jZ_C}{R_{LOAD\_EQ} - jZ_C + jZ_L} \times V_{SWITCH\_NODE} \right| < V_{SWITCH\_NODE} \quad (7)$$

Equation (7) can be reduced to:

$$\left| \frac{R_{LOAD\_EQ} - jZ_C}{R_{LOAD\_EQ} - jZ_C + jZ_L} \right| < 1 \quad (8)$$

In Equation (8), the denominator of the fractional term must be greater than the numerator of the fractional term to satisfy the inequality. Therefore, the vector magnitude of the imaginary portion of the denominator must be greater than the vector magnitude of the imaginary portion of the numerator as follows:

$$j(Z_L - Z_C) > jZ_C \quad (9)$$

Therefore:

$$Z_L > 2 \cdot Z_C \quad (10)$$

A total impedance $Z_{TANK}$ of the resonant tank circuit 150 is:

$$Z_{TANK} = R_{LOAD\_EQ} - jZ_C + jZ_L = R_{LOAD_{EQ}} + j(Z_L - jZ_C) \quad (11)$$

Combining Equation (10) and (11) results in the following Equation (12) for the total tank impedance:

$$Z_{TANK} = R_{LOAD\_EQ} + j(Z_L - jZ_C) > R_{LOAD\_EQ} + jZ_C \quad (12)$$

Because $Z_C$ is always positive, the positive imaginary term $jZ_C$ causes the total tank impedance $Z_{TANK}$ to always be inductive. This guarantees that soft switching always occurs when the voltage across the resonant capacitor voltage $V_{CRES}$ is clamped below the peak amplitude $V_{RAIL}/2$ of the AC input of the resonant tank circuit 150 from the switched node 136.

The further modified LED driver 500 of FIG. 8 solves the problems and drawbacks of the conventional LED driver 100 of FIG. 1. The further modified LED driver provides an improved LED load startup with a reduced or eliminated turn-on current spike and with soft switching at all times. The improvements disclosed herein result from splitting the original DC-blocking capacitor 160 of FIG. into two DC-blocking capacitors connected between the voltage bus 122 and the primary ground bus 124 to force the DC offset on the resonant tank circuit capacitor 156 to be zero volts. Spitting the DC-blocking capacitor enables the resonant tank circuit 150 to attain a DC balance before the startup occurs, which eliminates the voltage overshoot on the output capacitor output buffer and filter capacitor 210 and eliminates LED startup flash. Splitting the DC-blocking capacitor also reduces the initial turn-on voltage spike on the first semiconductor switch 132.

The first clamping diode 410 and the second clamping diode 412 limit the voltage $V_{CRES}$ across the resonant tank circuit capacitor 156 to no more than half the rail voltage (e.g., $\pm V_{RAIL}/2$). Clamping of the resonant tank circuit capacitor voltage assures that the half-bridge switching circuit 130 operates in a soft-switching mode at all times. The two clamping diodes also force the resonant tank circuit 150 to be inductive at all times.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A driver circuit for providing DC power to a DC load having a plurality of light-emitting diodes (LEDs), the driver circuit comprising:
    a reference bus;
    a voltage source that provides an input voltage referenced to the reference bus;
    an input voltage bus that receives the input voltage;
    a variable-frequency voltage generation circuit that generates a square-wave signal on a switched node, the square-wave signal having a first frequency at an initial startup and having a second, lower frequency when operating in a steady-state condition;
    a resonant tank circuit having an input connected to the switched node and having a resonant tank circuit output node, the resonant tank circuit comprising a resonant tank circuit inductor connected between the switched node and the resonant tank circuit output node, the resonant tank circuit further comprising a resonant tank circuit capacitor, the resonant tank circuit capacitor connected between the resonant tank circuit output node and a DC balance node;
    an output transformer having a primary winding having a first terminal connected to the resonant tank circuit output node and having a second terminal connected to the DC balance node, the output transformer having at least one secondary winding that generates a secondary AC voltage responsive to a primary voltage across the primary winding;
    a first DC-blocking capacitor connected between the input voltage bus and the DC balance node;

a second DC-blocking capacitor connected between the DC balance node and the reference bus; and a rectifier circuit connected to the at least one secondary winding of the output transformer to receive the secondary AC voltage, the rectifier circuit configured to rectify the secondary AC voltage to provide a DC voltage to the DC load to produce a load current through the DC load.

2. The driver circuit as defined in claim 1, wherein:

the resonant tank circuit capacitor has a resonant tank capacitance;

each of the first DC-blocking capacitor and the second DC-blocking capacitor has DC-blocking capacitance; and the DC-blocking capacitance is greater than the resonant tank capacitance.

3. The driver circuit as defined in claim 2, wherein the DC-blocking capacitance is at least twenty times the resonant tank capacitance.

4. The driver circuit as defined in claim 1, further comprising:

a first clamping diode connected between the resonant tank circuit output node and the input voltage bus; and a second clamping diode connected between the resonant tank circuit output node and the reference bus.

5. The driver circuit as defined in claim 1 wherein the variable-frequency voltage generating circuit comprises:

a first semiconductor switch coupled between the input voltage bus and a switched node;

a second semiconductor switch coupled between the switched node and the reference bus;

a self-oscillating switch driver integrated circuit (IC) having a first driver output coupled to the first semiconductor switch and having a second driver output coupled to the second semiconductor switch, the switch driver IC selectively enabling the first semiconductor switch and the second semiconductor switch at a variable frequency to generate a switched voltage signal on the switched node, the switch driver IC varying the variable frequency in response to a magnitude of an input parameter on a control terminal; and a frequency control circuit connected to the control terminal of the switch driver IC, the frequency control circuit providing the input parameter to the control terminal, the frequency control circuit providing the input parameter at a first magnitude when the voltage source initially provides the input voltage on the input voltage bus, the frequency control circuit varying the input parameter to a second magnitude over a selected duration, the switch driver IC responsive to the first magnitude to operate at a first frequency when the voltage source initially provides power to the input voltage bus and responsive to the second magnitude to operate at a second frequency after the selected duration.

6. The driver circuit as defined in claim 5, wherein:

the input parameter is a resistance;

the resistance has a first lower magnitude when the voltage source initially provides the input voltage to the input voltage bus, the first lower magnitude causing the switch driver IC to operate at a first frequency; and the resistance has a second higher magnitude after the selected duration, the second higher magnitude causing the switch driver IC to operate at a second frequency, the second frequency lower than the first frequency.

7. A method for preventing startup flash of a light-emitting diode (LED) load, the method comprising:

switching a switched node voltage between a first voltage magnitude and a second voltage magnitude at a variable frequency, the variable frequency having a first frequency at an initial startup and having a second frequency a selected duration after the initial startup;

applying the switched node voltage to an input of a resonant tank circuit, the resonant tank circuit having a resonant tank circuit inductor, a resonant tank circuit capacitor and a primary winding of an output transformer, the resonant tank circuit inductor connected between the input of the resonant tank circuit and a resonant tank circuit output node, the resonant tank circuit capacitor and the primary winding of the output transformer connected in parallel between the resonant tank circuit output node and a DC balance node;

coupling a first DC-blocking capacitor between the DC balance node and a first bus having the first voltage magnitude;

coupling a second DC-blocking capacitor between the DC balance node and a second bus having the second voltage magnitude; and rectifying an AC voltage on a secondary winding of the output transformer to generate a DC output voltage to drive the LED load.

8. The method as defined in claim 7, further comprising selecting a capacitance for each of the first DC-blocking capacitor and the second DC-blocking capacitor to be greater than a capacitance of the resonant tank circuit capacitor.

9. The method as defined in claim 8, wherein the capacitance of each of the first DC-blocking capacitor and the second DC-blocking capacitor is at least twenty times the capacitance of the resonant tank circuit capacitor.

10. The method as defined in claim 7, further comprising:

coupling a first clamping diode between the resonant tank circuit output node and the first bus; and coupling a second clamping diode between the resonant tank circuit output node and the second bus.

11. A driver circuit for providing DC power to a DC load having a plurality of light-emitting diodes (LEDs), the driver circuit comprising:

a voltage source that provides an input voltage on an input voltage bus, the input voltage referenced to a reference voltage on a reference bus;

a switching circuit that generates a switched voltage on a switched node, the switched voltage switching between the input voltage and the reference voltage;

a DC balance circuit comprising a first DC-blocking capacitor connected between the input voltage bus and a DC balance node and a second DC-blocking capacitor connected between the DC balance node and the reference bus;

a resonant tank circuit having a resonant tank circuit input node connected to the switched node, and a resonant tank inductor connected between the resonant tank circuit input node and a resonant tank circuit output node;

an output transformer having a primary winding, the primary winding having a first terminal coupled to the resonant tank circuit output node and having a second terminal coupled to the DC balance node, the output transformer having at least one secondary winding; and an output circuit connected to the at least one secondary winding to provide power to the DC load, wherein the resonant tank circuit further includes a resonant tank circuit capacitor connected between the resonant tank circuit output node and the DC balance node, the resonant tank circuit capacitor connected in parallel with the primary winding of the output transformer, the resonant tank circuit capacitor having a resonant tank capacitance;

wherein each of the first DC-blocking capacitor and the second DC-blocking capacitor has a DC-blocking capacitance; and wherein the DC-blocking capacitance is greater than the resonant tank capacitance.

12. The driver circuit as defined in claim 11, wherein the DC-blocking capacitance is at least twenty times the resonant tank capacitance.

13. The driver circuit as defined in claim 11, wherein:

the switching circuit operates at a first operating frequency when the voltage source initially provides the input voltage;

the switching circuit operates at a decreasing operating frequency during an initial startup duration; and the switching circuit operates at a constant operating frequency after the initial startup duration, the constant operating frequency lower than the first operating frequency.

* * * * *